United States Patent
Ponnuru et al.

(10) Patent No.: US 10,657,052 B2
(45) Date of Patent: May 19, 2020

(54) INFORMATION HANDLING SYSTEM WITH PRIORITY BASED CACHE FLUSHING OF FLASH DUAL IN-LINE MEMORY MODULE POOL

(71) Applicant: DELL PRODUCTS, LP, Round Rock, TX (US)

(72) Inventors: Viswanath Ponnuru, Bangalore (IN); Ravishankar Kanakapura Nanjundaswamy, Bangalore (IN); Parmeshwr Prasad, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 86 days.

(21) Appl. No.: 15/962,721

(22) Filed: Apr. 25, 2018

(65) Prior Publication Data

US 2019/0332527 A1    Oct. 31, 2019

(51) Int. Cl.
*G06F 12/0804* (2016.01)

(52) U.S. Cl.
CPC .. *G06F 12/0804* (2013.01); *G06F 2212/1032* (2013.01); *G06F 2212/2022* (2013.01)

(58) Field of Classification Search
None
See application file for complete search history.

(56) References Cited

U.S. PATENT DOCUMENTS

| | | | |
|---|---|---|---|
| 6,073,172 A | 6/2000 | Frailong et al. | |
| 8,949,502 B2 | 2/2015 | McNight et al. | |
| 9,710,179 B2 | 7/2017 | Jenne et al. | |
| 9,817,754 B2 | 11/2017 | Kandasamy et al. | |
| 2003/0037071 A1* | 2/2003 | Harris | G06F 11/2089 |
| 2004/0158701 A1 | 8/2004 | Merkin | |
| 2006/0179213 A1* | 8/2006 | Brittain | G06F 13/161 711/105 |
| 2007/0180203 A1* | 8/2007 | Ramgarajan | G06F 13/1647 711/157 |
| 2008/0320214 A1* | 12/2008 | Ma | G06F 3/0613 711/103 |
| 2012/0239857 A1* | 9/2012 | Jibbe | G06F 12/0246 711/103 |
| 2013/0003288 A1 | 1/2013 | Kanapathippillai et al. | |
| 2014/0095769 A1 | 4/2014 | Borkenhagen | |

(Continued)

OTHER PUBLICATIONS

Unpublished U.S. Appl. No. 15/926,541, filed Mar. 20, 2018.

*Primary Examiner* — William E. Baughman
(74) *Attorney, Agent, or Firm* — Larson Newman, LLP (57) ABSTRACT

An information handling system includes flash dual in-line memory modules, a central processing unit, and a memory controller. The memory controller detects that a value is written to a first flush hint register of a table. The first flush hint register is associated with a first flash pool of the flash dual in-line memory modules. The memory controller detects that a value is written to a second flush hint register of the table. The second flush hint register is associated with a second flash pool of the flash dual in-line memory modules. The memory controller flushes first data for the first flash pool and second data for the second flash pool in the cache to flash dual in-line memory modules in order of priority based on a first priority of the first pool and a second priority of the second pool.

17 Claims, 5 Drawing Sheets

(56) References Cited

U.S. PATENT DOCUMENTS

| | | |
|---|---|---|
| 2015/0254004 A1* | 9/2015 | Colgrove ............... G06F 3/061 |
| | | 711/103 |
| 2017/0160936 A1 | 6/2017 | Chinnakkonda Vidyapoornachary et al. |
| 2017/0371695 A1* | 12/2017 | Sanjeepan ............ G06F 3/0619 |
| 2018/0032439 A1 | 2/2018 | Jenne et al. |

* cited by examiner

INFORMATION HANDLING SYSTEM WITH PRIORITY BASED CACHE FLUSHING OF FLASH DUAL IN-LINE MEMORY MODULE POOL

FIELD OF THE DISCLOSURE

The present disclosure generally relates to information handling systems, and more particularly relates to an information handling system with priority based cache flushing of flash dual in-line memory module pool.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes flash dual in-line memory modules, a central processing unit, and a memory controller. The memory controller may detect a flush command for a cache of the central processing unit. The memory controller may then detect that a value is written to a first flush hint register of a table. The first flush hint register is associated with a first flash pool of the flash dual in-line memory modules. The memory controller also may detect that a value is written to a second flush hint register of the table. The second flush hint register is associated with a second flash pool of the flash dual in-line memory modules. The memory controller may then flush first data for the first flash pool and second data for the second flash pool in the cache to flash dual in-line memory modules in order of priority based on a first priority of the first pool and a second priority of the second pool.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
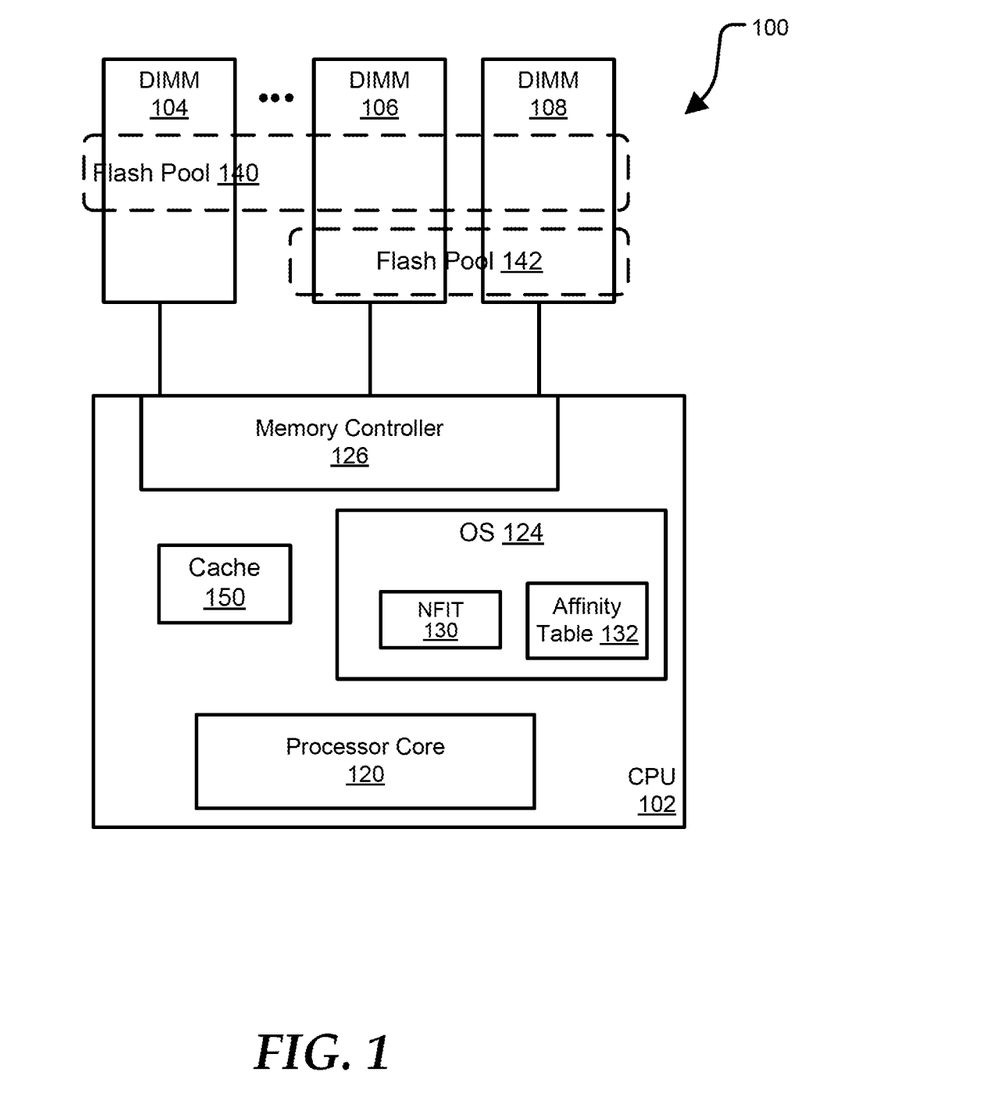
FIG. 1 is a block diagram of a portion of an information handling system according to at least one embodiment of the disclosure.

FIG. 1 shows an information handling system 100 including central processing unit (CPU) 102, dual in-line memory modules (DIMMs) 104, 106, and 108, and a management utility 110. In an embodiment, the information handling system 100 can be a server, a personal computer, a laptop computer, or the like. The CPU 102 includes a processor core 120, an operating system (OS) 122, and a memory controller 124. The OS 122 includes a non-volatile dual in-line memory module (NVDIMM) firmware interface table (NFIT) 130, and an affinity table 132. In an embodiment, the NFIT 130 can store information for the DIMMs 104, 106, and 108. In an embodiment, the DIMMs 104, 106, and 108 can include only persistent memory, such as flash memory, and will be referred to herein as flash DIMMs. For example, the DIMMs 104, 106, 108 may be Apache Pass (AEP) devices. One of ordinary skill in the art will recognize that while FIG. 1 illustrates DIMMs 104, 106, and 108, this disclosure is not limited to three DIMMs but can be applied to an N-way interleave set of DIMMs, as indicated by the ellipses in between DIMMs 104 and 106.

The central processing unit 102 may operate to provide data processing functionality of information handling system 100, such as is typically associated with an information handling system. As such, central processing unit 102 represents a data processing apparatus, such as one or more processor cores, and the associated data input and output (I/O) functionality, such as a chipset component, and other I/O processor components. The central processing unit 102 operates to execute machine-executable code to perform the data processing tasks associated with information handling system 100.

The memory controller 124 represents a portion of a processor complex that is dedicated to the management of the data storage and retrieval from the memory devices of information handling system 100, and information handling system 100 may include one or more additional memory controllers similar to the memory controller 124, as needed or desired. The memory controller 124 may reside on a system printed circuit board, may be integrated into an I/O processor component, may be integrated with a processor on a system-on-a-chip (SoC), may be integrated with the flash DIMMs 104, 106, and 018, or may be implemented in another way, as needed or desired. The memory controller 124 operates to provide data and control interfaces to one or more DIMM, such as flash DIMMs 104, 106, and 108, in accordance with a particular memory architecture. For example, the memory controller 124 and the flash DIMMs 104, 106, and 108 may operate in accordance with a Double-Data Rate (DDR) standard, such as a JEDEC DDR4 or DDR5 standard. While these operations are being discussed with respect to NVDIMMs, the operations can be extended to all disk types including serial attached small computer system interface (SAS) drives, serial AT attachment (SATA) drives, non-volatile memory express (NVMe) drives, solid state drives (SSDs), hard disk drives (HDDs), or the like as long as the disk is configured with namespace partitions.

During operation, before any usable storage space within the flash DIMMs 104, 106, and 108 can be accessed by the OS 122, goal configurations for the flash DIMMs 104, 106, and 108 are created. The goal configuration can include a mode of operation, an interleave set or sets from the flash DIMMs 104, 106, and 108, or the like. The mode of operation can be an application-direct mode, a memory mode, a storage mode, or the like. In the application-direct mode, applications executed by the processor core 120 via the OS 122 can directly access data stored within the flash DIMMs 104, 106, and 108. In the memory mode, a dynamic random access portion (DRAM) of the flash DIMMs 104, 106, and 108 can be accessed to store data in the flash DIMMs 104, 106, and 108. In the storage mode, data can be accessed in the flash DIMMs 104, 106, and 108 in a block data format. These modes of operation can be set as attributes for the flash DIMMs 104, 106, and 108 by the OS 122, by unified extensible firmware interface (UEFI) environment of a BIOS, or the like. After the goal configuration for the flash DIMMs 104, 106, and 108 has been set, the information handling system 100 can create one or more pools of memory storage, such as flash pools 140 and 142, from the existing interleave set of flash DIMMs 104, 106, and 108.

During a write operation to one or more pools of the flash DIMMs 104, 106, and 108, data can be temporarily stored within a cache of the CPU 102, such as the cache 150. However, if power is lost during a write operation, a flush of the cache 150 may be needed to ensure that the data in the cache is stored in the persistent memory of the flash DIMMs 104, 106, and 108. In previous information handling systems a flush of the cache 150 is performed through a write pending queue (WPQ) flush command, or other instructions such as CLFLUSHOPT, CLFLUSH, CLWB, or the like. However, instructions like CLWB can be used to flush the store from the CPU cache. At the point, the store may spend some amount of time in the WPQ region of DIMMS 104. 106, and 108 memory controller. In this situation, a critical application can be associated with the flash pool 142, but flush of the data in cache 150 via the WPQ flush may not be completed before power is lost and the data associated with the critical application may not be flushed to flash pool 142 of the flash DIMMs 106 and 108. Thus, if these flush commands and instructions are not used correctly the performance of the information handling system 100 can be degraded. Therefore, an improved priority cache flushing for data in cache 150 to the flash DIMMs 104, 106, and 107 of the information handling system 100 is described herein.

Figure 2:
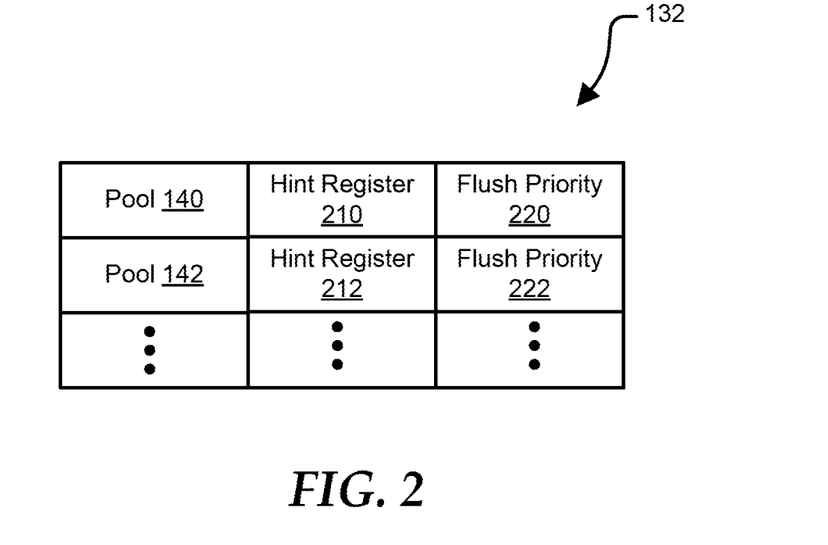
FIG. 2 is a diagram of an affinity table to enable priority cache flushing in the information handling system according to at least one embodiment of the disclosure.

A driver, such as a driver within the memory controller 124, of the flash DIMMs 104, 106, and 108 can create an attribute of a flash pool to enroll the flash pool with the affinity table 132. In an embodiment, the enrollment of the flash pools 140 and 142 can enable priority flushing for the flash pools 140 and 142. As shown in FIG. 2, the affinity table 132 can include hint register mapping 210 and 212, flush priorities 220 and 222, pool attributes 230 and 232, or the like for the flash pools 140 and 142. One of ordinary skill in the art will recognize that while FIG. 2 illustrates entries for only flash pools 140 and 142, this disclosure is not limited to two flash pools but can be applied to additional flash pools, as indicated by the ellipses below flash pool 142 in the affinity table 132. The description of creating the affinity table 132 to enable priority cache flushing will be described with respect to FIGS. 1 and 2.

Referring back to FIG. 1, the memory controller 124 can parse the NFIT 130 located within the OS 122 and can extract flush hint structures for the flash pools 140 and 142. In an embodiment, the flush hint structures from the NFIT 130 can be the physical addresses within the flash DIMMs 104, 106, 108 that are assigned to each of the flash pools 140 and 142. The memory controller 124 can then assign hint registers within the affinity table 132 to the flash pools 140 and 142. For example, hint register 210 can be assigned to flash pool 140 and hint register 212 can be assigned to flash pool 142. The memory controller 124 can then map the hint registers 210 and 212 to the physical addresses of the flash DIMMs 104, 106, and 108. If a flash pool, such as flash pool 140 or 142, is interleaved between multiple memory controllers, then relative hint addresses across the multiple memory controllers can be calculated. In this embodiment, an administrator can create an affinity table for each memory controller and associated those affinity tables with different priorities, such that each hint register for the flash pool 140 or 142 should be assigned to that flash pool and mapped to the physical addresses within the flash DIMMs of the multiple memory controllers.

The memory controller 124 can then calculate a priority value for the flash pools 140 and 142 based on input/output operations of the flash pools 40 and 142, and can store the priority values 220 and 222 in the affinity 132. In an embodiment, the algorithm, as shown in EQ. 1 below, can be utilized to calculate priority flushing index for the flash pools 140 and 142.

$$PF=\rho0*NOI*\eta1+\rho1*CD*\eta1+\rho2FP*\eta1+ \ldots +\rho(X)$$
$$\eta=\Sigma\rho i(NOI,CD,FP)\eta i \qquad \text{EQ. 1}$$

PF=Priority flushing;
NOI=Number of I/O happening for flash pool;
CD=Cached data;
FP=Flushing priority; and
η=Number of occurrences of an event.

After the flush priority values 220 and 222 are stored within the affinity table 132, the memory controller can write a value to the flush hint registers 210 and 212 of the affinity table 132. In an embodiment, the value written the flush hint registers 210 and 212 can be any value, and the storage of a value can ensures that data on critical pools, such as flash pools 140 and 142 are flushed based in order of the flush priority values 220 and 222.

A flush command can be received by the memory controller 124. The memory controller 124 can then determine whether a value is written to one or more flush hint registers 210 and 212 within the affinity table 132. When a value is written to the flush hint registers 210 and 212, the memory controller 124 can then read the flush priority values 220 and 222 to determine an order to flush the data associated with the flash pools 140 and 142. For example, if the flush priority value 222 is a higher priority value, then the data in cache 150 can be flushed to the physical addresses within the flash DIMMs 104, 106, and 108 assigned to the flash pool 142. The memory controller 124 can determine the physical addresses for the flash pool 142 based on the mapping of the flush hint register 212 within the affinity table 132. The memory controller can then flush the data in cache 150 associated with the flash pool 140 based on the mapping of the physical addresses of the flush hint register 210. In an embodiment, after the memory controller has flush all of the data associated within the flash pools assigned a priority value, the memory controller 124 can receive a command that ensures all of the data within the cache 150 is stored in the persistent memory of the flash DIMMs 104, 106, and 108. In an embodiment, the command can be a SFENCE command. Thus, the use of the flush hint registers 210 and 220 and the flush priority values 220 and 222 can ensure that the data for critical applications associated with particular flash pools, such as flash pools 140 and 142, are flushed in a desired order to improve the speed that the memory controller 124 flushes the cache 150 and decrease data loss.

Figure 3:
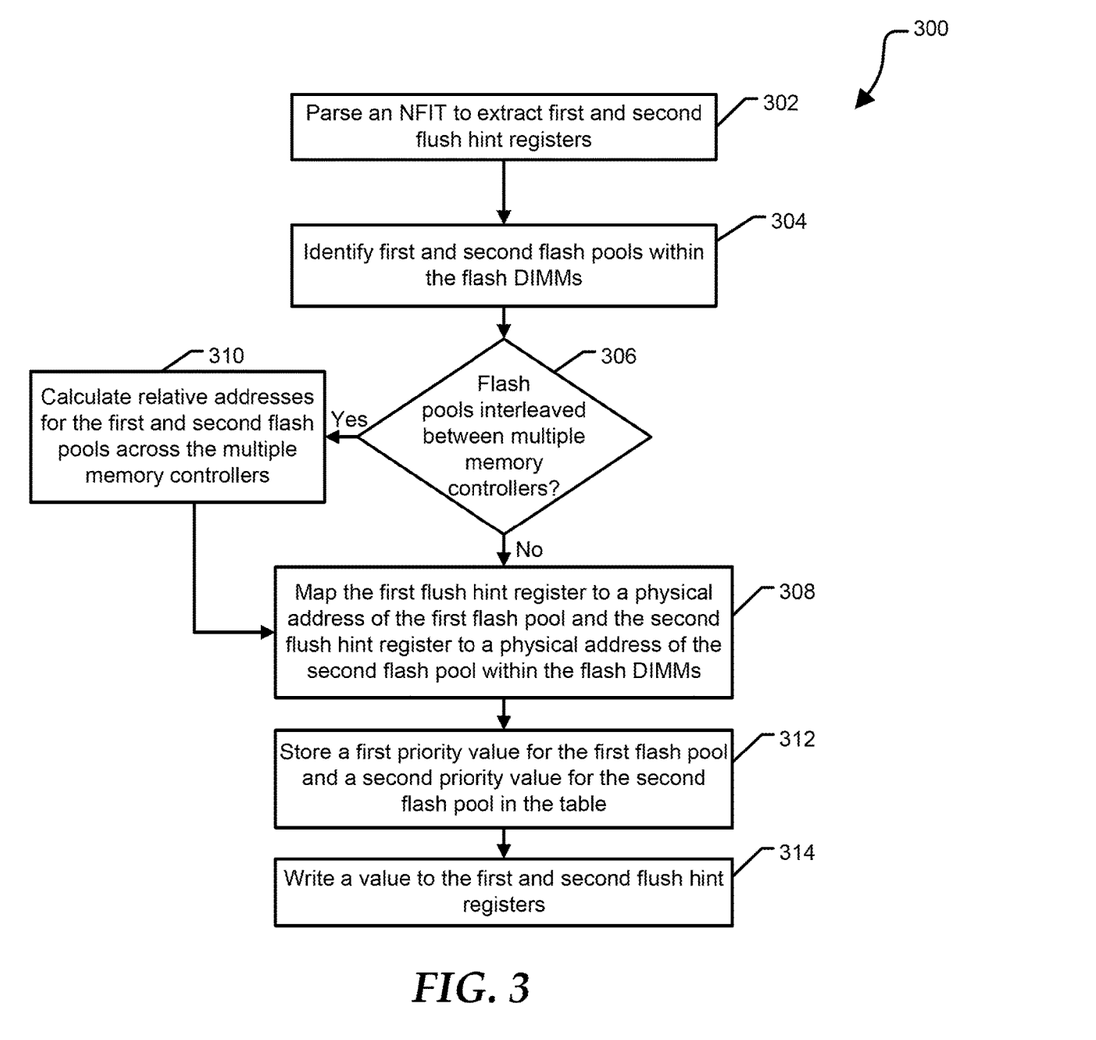
FIG. 3 is a flow diagram of a method for setting priority flushing of dual in-line memory module pools according to at least one embodiment of the present disclosure.

FIG. 3 is a flow diagram of a method for setting priority flushing of dual in-line memory module pools according to at least one embodiment of the present disclosure. At block 302, a dual in-line memory module (DIMMs) firmware interface table (NFIT) table is parsed to extract a flush hint register. First and second flash pools within flash DIMMs are identified at block 304. In an embodiment the first and second flash pools can be storage locations with multiple flash DIMMs of an information handling system. A flash pool can be associated with a single memory controller or interleaved between multiple memory controllers. At block 306, a determination is made whether at least one of the flash pools is interleaved between multiple memory controllers.

If none of the flash pools are interleaved between multiple memory controllers, the first flush register is mapped to a physical address of the first flash pool and the second flush register is mapped to a physical address of the second flash pool at block 308. If at least one of the flash pools is interleave between multiple memory controllers, relative addresses are calculated for the flash pools interleaved between multiple memory controllers at block 310, and the flow continues at block 308. At block 312, a first priority value for the first flash pool is stored in the affinity table and a second priority value for the second flash pool is stored in the affinity table. In an embodiment, the priority values for the first and second flash pools are calculated based on the input/output operations for the first and second flash pools. A value is written to the first and second flush hint registers of the affinity table at block 314. In an embodiment, the value written ensures that data on critical pools are flushed based on priority values.

Figure 4:
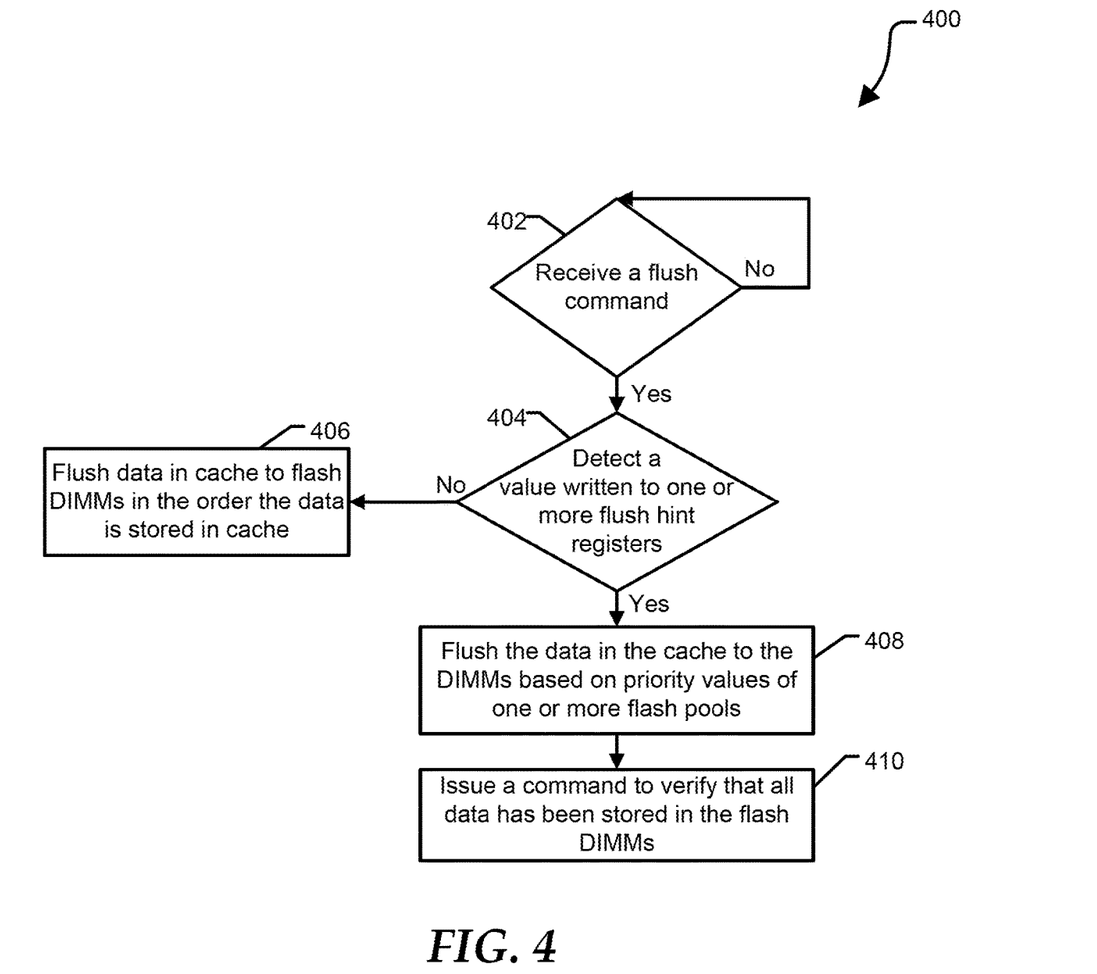
FIG. 4 is a flow diagram of a method for flushing cache data based on pool flush priorities according to at least one embodiment of the present disclosure.

FIG. 4 is a flow diagram of a method for flushing cache data based on pool flush priorities according to at least one embodiment of the present disclosure. At block 402, a determination is made whether a flush command is received. In an embodiment, the flush command can be for a cache of a central processing unit of an information handling system. In an embodiment, during a normal write operation data from the cache can stored into one or more flash DIMMs based on pools of storage locations within the flash DIMMs. In an embodiment some pools can be defined as critical pools, such as a pool residing within flash DIMM configured in a storage mode based on the storage mode configuration enabling applications to directly store data within the flash DIMM.

When a flush command is received, a determination is made whether a value is written to one or more flush registers within an affinity table at block 404. If a value is not written to any of the flush registers, data in the cache is flushed in the order the data is stored within the cache at block 406. If a value is written to one or more of the flush registers, the data in the cache is flushed to the flash DIMMs based on priority values of one or more flash pools at block 408. At block 410, a command is issued to verify that all data has been stored in the flash DIMMs.

Figure 5:
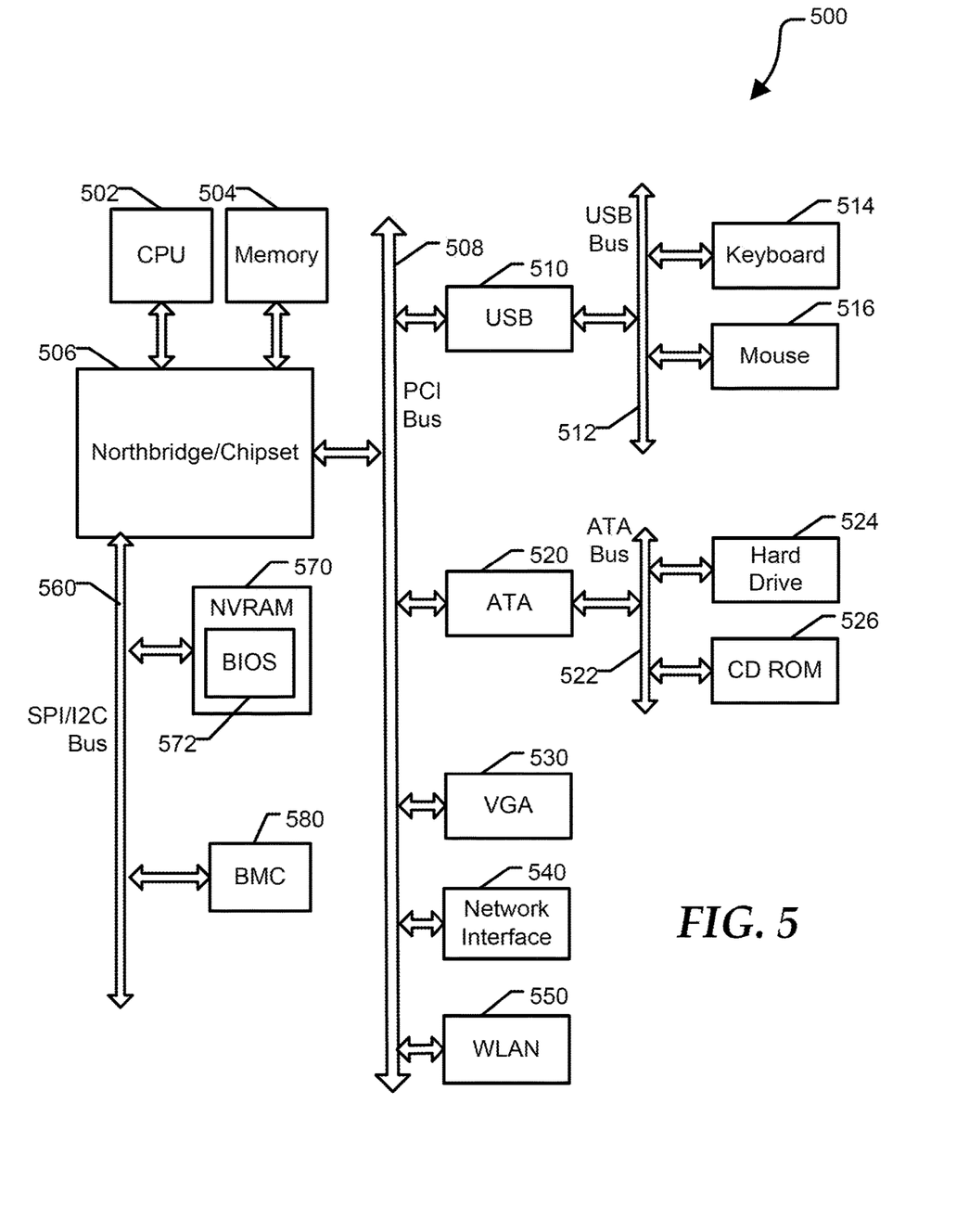
FIG. 5 is a block diagram of a general information handling system according to an embodiment of the present disclosure.

FIG. 5 illustrates a general information handling system 500 including a processor 502, a memory 504, a northbridge/chipset 506, a PCI bus 508, a universal serial bus (USB) controller 510, a USB 512, a keyboard device controller 514, a mouse device controller 516, a configuration an ATA bus controller 520, an ATA bus 522, a hard drive device controller 524, a compact disk read only memory (CD ROM) device controller 526, a video graphics array (VGA) device controller 530, a network interface controller (NIC) 540, a wireless local area network (WLAN) controller 550, a serial peripheral interface (SPI) bus 560, a NVRAM 570 for storing BIOS 572, and a baseboard management controller (BMC) 580. BMC 580 can be referred to as a service processor or embedded controller (EC). Capabilities and functions provided by BMC 580 can vary considerably based on the type of information handling system. For example, the term baseboard management system is often used to describe an embedded processor included at a server, while an embedded controller is more likely to be found in a consumer-level device. As disclosed herein, BMC 580 represents a processing device different from CPU 502, which provides various management functions for information handling system 500. For example, an embedded controller may be responsible for power management, cooling management, and the like. An embedded controller included at a data storage system can be referred to as a storage enclosure processor.

For purpose of this disclosure information handling system 500 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 500 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 500 can include processing resources for executing machine-executable code, such as CPU 502, a programmable logic array (PLA), an embedded device such as a System-on-a-Chip (SoC), or other control logic hardware. Information handling system 500 can also include one or more computer-readable medium for storing machine-executable code, such as software or data.

System 500 can include additional processors that are configured to provide localized or specific control functions, such as a battery management controller. Bus 560 can include one or more busses, including a SPI bus, an I2C bus, a system management bus (SMBUS), a power management bus (PMBUS), and the like. BMC 580 can be configured to provide out-of-band access to devices at information handling system 500. As used herein, out-of-band access herein refers to operations performed prior to execution of BIOS 572 by processor 502 to initialize operation of system 500.

BIOS 572 can be referred to as a firmware image, and the term BIOS is herein used interchangeably with the term firmware image, or simply firmware. BIOS 572 includes instructions executable by CPU 502 to initialize and test the hardware components of system 500, and to load a boot loader or an operating system (OS) from a mass storage device. BIOS 572 additionally provides an abstraction layer for the hardware, such as a consistent way for application programs and operating systems to interact with the keyboard, display, and other input/output devices. When power is first applied to information handling system 500, the system begins a sequence of initialization procedures. During the initialization sequence, also referred to as a boot sequence, components of system 500 are configured and enabled for operation, and device drivers can be installed. Device drivers provide an interface through which other components of the system 500 can communicate with a corresponding device.

Information handling system 500 can include additional components and additional busses, not shown for clarity. For example, system 500 can include multiple processor cores, audio devices, and the like. While a particular arrangement of bus technologies and interconnections is illustrated for the purpose of example, one of skill will appreciate that the techniques disclosed herein are applicable to other system architectures. System 500 can include multiple CPUs and redundant bus controllers. One or more components can be integrated together. For example, portions of northbridge/chipset 506 can be integrated within CPU 502. Additional components of information handling system 500 can include one or more storage devices that can store machine-executable code, one or more communications ports for communicating with external devices, and various input and output (I/O) devices, such as a keyboard, a mouse, and a video display. An example of information handling system 500 includes a multi-tenant chassis system where groups of tenants (users) share a common chassis, and each of the tenants has a unique set of resources assigned to them. The resources can include blade servers of the chassis, input/output (I/O) modules, Peripheral Component Interconnect-Express (PCIe) cards, storage controllers, and the like.

Information handling system 500 can include a set of instructions that can be executed to cause the information handling system to perform any one or more of the methods or computer based functions disclosed herein. The information handling system 500 may operate as a standalone device or may be connected to other computer systems or peripheral devices, such as by a network.

In a networked deployment, the information handling system 500 may operate in the capacity of a server or as a client user computer in a server-client user network environment, or as a peer computer system in a peer-to-peer (or distributed) network environment. The information handling system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single information handling system 500 is illustrated, the term "system" shall also be taken to include any collection of systems or sub-systems that individually or jointly execute a set, or multiple sets, of instructions to perform one or more computer functions.

The information handling system 500 can include a disk drive unit and may include a computer-readable medium, not shown in FIG. 5, in which one or more sets of instructions, such as software, can be embedded. Further, the instructions may embody one or more of the methods or logic as described herein. In a particular embodiment, the instructions may reside completely, or at least partially, within system memory 504 or another memory included at system 500, and/or within the processor 502 during execution by the information handling system 500. The system memory 504 and the processor 502 also may include computer-readable media.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a processor or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a plurality of flash dual in-line memory modules including a first dual in-line memory module and a second dual in-line memory module;
a central processing unit to communicate with the flash dual in-line memory modules; and
a memory controller to communicate with the central processing unit and with the flash dual in-line memory modules, the memory controller to detect a flush command for a cache of the central processing unit, to detect that a value is written to a first flush hint register of a table, wherein the first flush hint register is associated with a first flash pool of the flash dual in-line memory modules, to detect that a value is written to a second flush hint register of the table, wherein the second flush hint register is associated with a second flash pool of the flash dual in-line memory modules, to determine whether the first flash pool is interleaved between more than one memory controller, to calculate relative flush hint addresses across the more than one memory controllers, and to flush first data for the first flash pool and second data for the second flash pool in the cache to flash dual in-line memory modules in order of priority based on a first priority of the first pool and a second priority of the second pool.

2. The information handling system of claim 1, the memory controller further to map the first flush hint register to a first physical address within the flash dual in-line memory modules for the first flash pool.

3. The information handling system of claim 1, wherein the first priority of the first flash pool is calculated based on a first number of input/output operations for the first flash pool and the second priority of the second flash pool is calculated based on a second number of input/output operations for the second flash pool.

4. The information handling system of claim 1, the memory controller to issue a command to verify that all data in the cache has been stored in the flash dual in-line memory modules.

5. The information handling system of claim 1, the memory controller further to parse a dual in-line memory module firmware interface table to extract the first and second flush hint registers, to associate the first flush hint register with attributes of the first flash pool, and to associate the second flush hint register with attributes of the second flash pool.

6. The information handling system of claim 5, wherein the attributes for the first flash pool include the first flush priority, and hint register mapping.

7. A method comprising:
receiving, by a memory controller of an information handling system, a flush command for a cache of a central processing unit of the information handling system;
detecting, by the memory controller, that a value is written to a first flush hint register of a table within the central processing unit, wherein the first flush hint register is associated with a first flash pool of flash dual in-line memory modules of the information handling system;
detecting, by the memory controller, that a value is written to a second flush hint register of the table, wherein the second flush hint register is associated with a second flash pool of the flash dual in-line memory modules;
determining whether the first flash pool is interleaved between more than one memory controllers;
calculating relative flush hint addresses across the more than one memory controllers in response to the first flash pool being interleaved between more than one memory controllers; and
flushing, by the memory controller, first data for the first flash pool and second data for the second flash pool in the cache to flash dual in-line memory modules in order of priority based on a first priority of the first pool and a second priority of the second pool.

8. The method of claim 7, further comprising:
mapping the first flush hint register to a first physical address within the flash dual in-line memory modules for the first flash pool.

9. The method of claim 7, wherein the first priority of the first flash pool is calculated based on a first number of input/output operations for the first flash pool and the second priority of the second flash pool is calculated based on a second number of input/output operations for the second flash pool.

10. The method of claim 7, further comprising:
issuing a command to verify that all data in the cache has been stored in the flash dual in-line memory modules.

11. The method of claim 7, further comprising:
parsing a dual in-line memory module firmware interface table to extract the first and second flush hint registers;
associating the first flush hint register with attributes of the first flash pool; and
associating the second flush hint register with attributes of the second flash pool.

12. The method of claim 11, wherein the attributes for the first flash pool include the first flush priority, and hint register mapping.

13. A method comprising:
parsing a dual in-line memory module firmware interface table to extract first and second flush hint registers;
associating the first flush hint register with first attributes of a first flash pool of a plurality of dual in-line memory modules of an information handling system;
associating the second flush hint register with second attributes of a second flash pool of the dual in-line memory modules;
mapping the first flush hint register to a first physical address within the flash dual in-line memory modules for the first flash pool;

mapping the second flush hint register to a second physical address within the flash dual in-line memory modules for the second flash pool;

writing a value to the first and second flush hint registers to indicate that data associated with the first and second flash pools are flushed to the flash dual in-line memory modules, wherein the data is in a cache of a central processing unit of the information handling system;

determining whether the first flash pool is interleaved between more than one memory controllers; and calculating relative flush hint addresses across the more than one memory controllers in response to the first flash pool being interleaved between more than one memory controllers.

14. The method of claim 13, further comprising:

storing a first priority value to the first flash pool; and storing a second priority value to the second flash pool, wherein first data for the first flash pool and second data for the second flash pool in the cache to flash dual in-line memory modules in order of priority based on the first priority of the first pool and the second priority of the second pool.

15. The method of claim 13, wherein the first priority of the first flash pool is calculated based on a first number of input/output operations for the first flash pool and the second priority of the second flash pool is calculated based on a second number of input/output operations for the second flash pool.

16. The method of claim 13, wherein the first attributes for the first flash pool include the first flush priority, and hint register mapping for the first flash pool.

17. The method of claim 13, wherein the second attributes for the second flash pool include the second flush priority, and hint register mapping for the second flash pool.

* * * * *